(12) United States Patent
Johnson

(10) Patent No.: US 7,503,305 B2
(45) Date of Patent: Mar. 17, 2009

(54) ROTATORY CRANK SHAFT

(76) Inventor: Arvid Murray Johnson, Factory 4/63 Whiteside St., Clayton South, Victoria (AU) 3169

( * ) Notice: Subject to any disclaimer, the term of this patent is extended or adjusted under 35 U.S.C. 154(b) by 636 days.

(21) Appl. No.: 10/519,957

(22) PCT Filed: Jun. 21, 2004

(86) PCT No.: PCT/AU2004/000808
§ 371 (c)(1),
(2), (4) Date: Dec. 30, 2004

(87) PCT Pub. No.: WO2004/113682
PCT Pub. Date: Dec. 29, 2004

(65) Prior Publication Data
US 2005/0235764 A1  Oct. 27, 2005

(30) Foreign Application Priority Data
Jun. 26, 2003 (AU) ............... 2003903244
Dec. 5, 2003 (AU) ............... 2003907214
Dec. 17, 2003 (AU) ............... 2003270961

(51) Int. Cl.
*F02B 75/32* (2006.01)
*F16H 37/12* (2006.01)

(52) U.S. Cl. ..................... 123/197.4; 74/55
(58) Field of Classification Search ............. 123/197.1, 123/197.3, 197.4; 74/44, 49, 52, 55
See application file for complete search history.

(56) References Cited

U.S. PATENT DOCUMENTS

| 1,867,981 | A | * | 7/1932 | Mudd ........................... 74/52 |
| 3,946,706 | A | * | 3/1976 | Pailler ..................... 123/197.3 |
| 4,078,439 | A | * | 3/1978 | Iturriaga-Notario ...... 123/197.1 |
| 4,237,741 | A | * | 12/1980 | Huf et al. ........................ 74/52 |
| 4,411,164 | A | | 10/1983 | Durenec et al. |
| 5,503,038 | A | * | 4/1996 | Aquino et al. ........... 123/197.1 |
| 5,664,464 | A | | 9/1997 | Carson |
| 5,934,229 | A | * | 8/1999 | Li et al. .................... 123/197.4 |

(Continued)

FOREIGN PATENT DOCUMENTS

DE  2519908 A  11/1976

(Continued)

OTHER PUBLICATIONS

International Search Report for PCT/AU2004/000808; ISA/AU; Mailed: Jul. 29, 2004.

*Primary Examiner*—Noah Kamen
(74) *Attorney, Agent, or Firm*—Harness, Dickey & Pierce, PLC

(57) ABSTRACT

An apparatus for converting linear motion into rotary motion or vice versa comprising a shaft (12) which is rotatable about a fixed axis (14) and carrying a circular cam (16) mounted eccentrically relative to that axis (14), the cam (16) being rotatably mounted within a disc (22) which is in turn rotatably mounted within a housing (24) mounted for linear reciprocating motion along a rectilinear axis (26) in a direction transverse to the axis (14) of the shaft (12) whereby reciprocating motion of the housing (24) along the rectilinear axis (26) is converted into rotation of the shaft (12), or rotation of the shaft (12) is converted into reciprocating motion of the housing (24) along the rectilinear axis (26).

7 Claims, 6 Drawing Sheets

U.S. PATENT DOCUMENTS 6,629,514 B1 * 10/2003 Gale .................. 123/55.2

FOREIGN PATENT DOCUMENTS

| DE | 3904716 A | 8/1990 |
| DE | 4035139 | 7/1992 |
| DE | 4445131 | 6/1996 |
| GB | 1460986 A | 1/1977 |
| JP | 59203801 | 11/1984 |
| JP | 4317461 | 11/1992 |
| WO | WO95/13464 | 5/1995 |
| WO | 00/08325 A | 2/2000 |

* cited by examiner

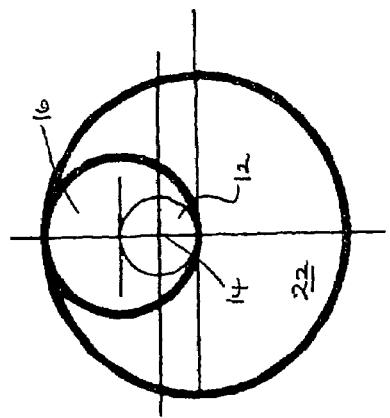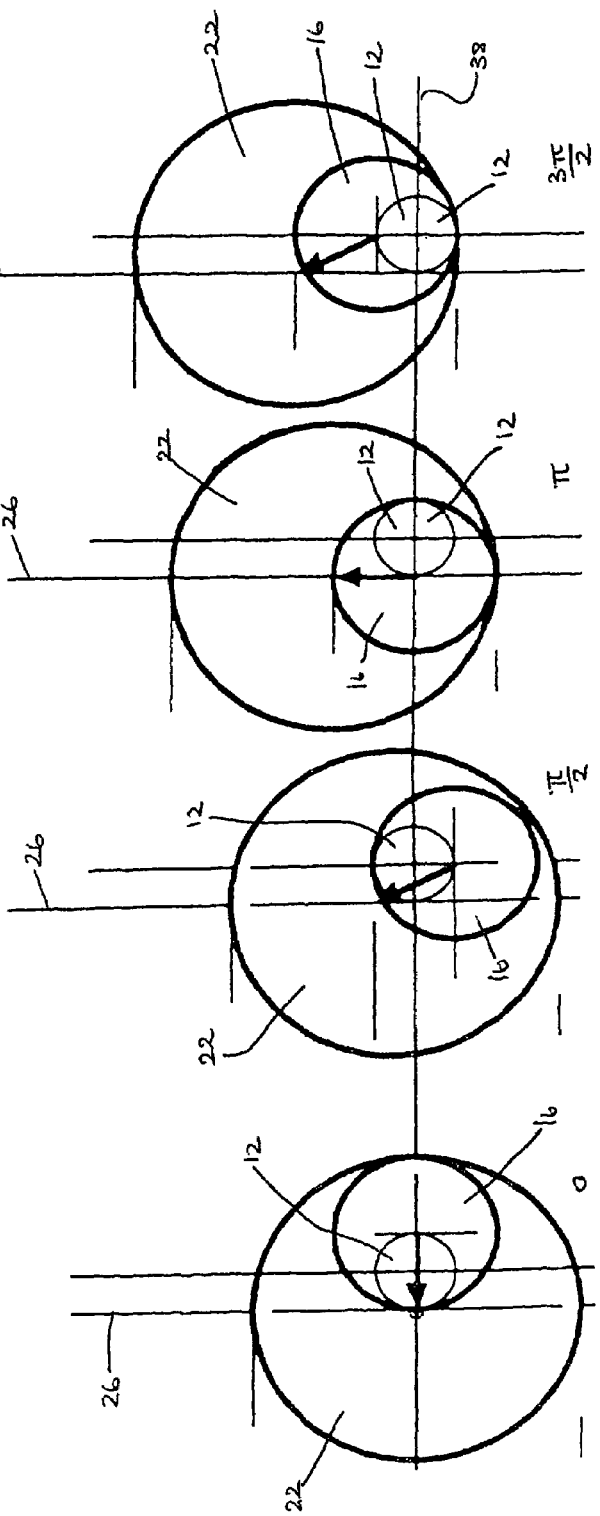

ROTATORY CRANK SHAFT

CROSS-REFERENCE TO RELATED APPLICATIONS

This Application is a U.S. National Stage of International Application No. PCT/AU2004/000808 filed 21 Jun. 2004. This application claims the benefit of Australian Patent Application No. 2003903244 filed 26 Jun. 2003, Australian Patent Application No. 2003907214, filed 5 Dec. 2003 and Australian Patent Application No. 2003270961, filed 17 Dec. 2003. The disclosure(s) of the above applications are incorporated herein by reference.

FIELD OF THE INVENTION

The invention relates to an apparatus for converting linear motion into rotary motion or vice versa, and, in particular, to an apparatus for converting linear motion into rotary motion in an internal combustion engine.

BACKGROUND OF THE INVENTION

It is known to provide an assembly comprising a crankshaft, connecting rod, gudgeon pin and piston for converting linear motion into rotary motion in an internal combustion engine. In a typical crankshaft arrangement, the crankshaft has one or more offset portions which are offset from the axis of rotation of the crankshaft, and the or each connecting rod is mounted for rotation about one of the offset portions. By means of the axes of rotation of the connecting rods being spaced from the axis of rotation of the crankshaft, pistons constrained within cylinders and mounted to free ends of the connecting rods move in reciprocating linear motion as the crankshaft rotates. Such an arrangement has the disadvantage of being limited to a symmetric cycle such that the piston moves at the same average velocity in the power (expansion) stroke as it does in the compression stroke. Moreover, typical arrangements of this type also have the disadvantage of the connecting rod being necessarily coupled to the piston by a pivotal coupling (commonly a pin) which experiences high stresses and is subject to wear and/or breakage.

Various alternative arrangements for connecting a reciprocating piston to a rotating crankshaft have also been proposed. One such arrangement is disclosed in U.S. Pat. No. 5,664,464 to Carson in which a piston is connected to a crankshaft by way of an offset crankpin 34 mounted through a cylindrical portion 40 which, in turn, is mounted for rotation within a reciprocating member assembly 10. However, this arrangement is also limited to a symmetric cycle in which the piston travels at the same average velocity in the power and compression strokes. Additionally, the device disclosed in this document is restricted to the offset of the crankpin 34 from the axis of the a being the same as the offset of the axis of the cylindrical portion 40 from the axis of the crankpin 34 which limits the geometry achievable for the cycle of the device.

OBJECT OF THE INVENTION

The present invention seeks to provide an alternative apparatus for converting linear motion into rotary motion or vice versa

SUMMARY OF THE INVENTION

In accordance with the present invention there is provided an apparatus for converting linear motion into rotary motion or vice versa comprising a shaft which is rotatable about a fixed axis and carrying a circular cam mounted eccentrically relative to that axis, the cam being rotatably mounted within a journal, an axis of rotation of the cam relative to the journal being spaced from a centre of the journal, the journal being in turn rotatably mounted within a housing mounted for reciprocating motion along a second axis in a direction transverse to the axis of the shaft whereby reciprocating motion of the housing along the second axis is converted into rotation of the shaft, or rotation of the shaft is converted into reciprocating motion of the housing along the second axis.

Preferably, the fixed axis of the shaft is spaced from the second axis. This feature enables the apparatus to provide an asymmetric cycle, which, advantageously, can be optimised, for example to provide power and compression strokes of different durations to optimise efficiency and/or power output of an engine using the apparatus.

Alternatively, the fixed axis of the shaft is in-line with the second axis.

Preferably, the housing is rigidly fixed to a piston of an internal combustion engine.

Preferably, the spacing of the fixed axis of the shaft from the second axis is such that the duration of a power stroke of the piston is shortened in relation to a compression stroke of the piston.

Preferably, the shortening of the duration of the power stroke results in an increase in the mean velocity of the piston over the power stroke.

Preferably, the journal is arranged so that rotation of the journal relative to its centre oscillates between clockwise and anticlockwise rotation, in response to unidirectional rotation of the shaft relative to the axis of the shaft.

Preferably, the journal is in the form of a disc.

BRIEF DESCRIPTION OF THE DRAWINGS

The invention is described, by way of non-limiting example only, with reference to the accompanying drawings in which:

FIG. 5 is a diagrammatic front view of a shaft, cam and journal of a further alternative apparatus for converting linear motion into rotary motion;

FIGS. 6A to 6D show successive configurations of the apparatus of FIG. 5 for different rotational positions of the shaft;

DETAILED DESCRIPTION

Figure 1:
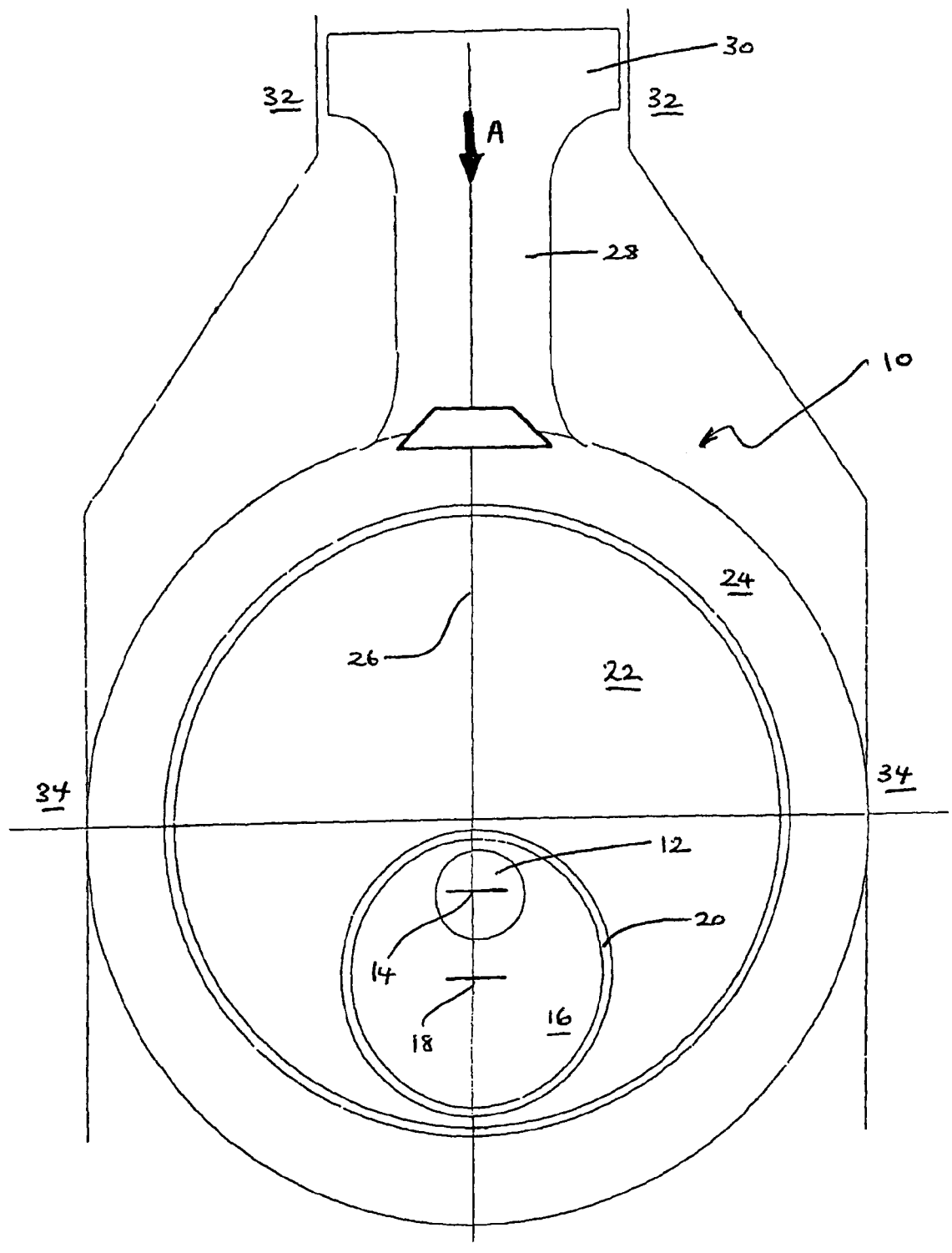
FIG. 1 is a diagrammatic front view of an apparatus for converting linear motion into rotary motion or vice versa, having a symmetric cycle.

Referring firstly to FIG. 1, an apparatus 10 for converting linear motion into rotary motion is shown as including a shaft 12 which is rotatable about a fixed axis 14 and carries a circular cam 16. The circular cam 16 is mounted eccentrically relative to the shaft 12 such that a central axis 18 of the cam 16 is spaced from the fixed axis 14. The cam 16 is rotatably mounted within a correspondingly dimensioned circular cavity 20 formed in a journal (in the form of disc 22) which is co-planar with the cam 16. The disc 22 is rotatably mounted within a housing 24 mounted for reciprocating motion along a second, rectilinear axis 26 in a direction transverse to the fixed axis 14 of the shaft 12. The reciprocating motion of the housing 24 along the rectilinear axis 26 is converted into rotation of the shaft 12. A connecting rod 28 is integrally formed with the housing 24, and is integrally formed at its other end to a piston 30.

The apparatus 10 may be used in an internal combustion engine to convert linear motion of the piston 30 along the rectilinear axis 26 into rotary motion of the shaft 12. Although the apparatus 10 will now be further described in use in converting linear motion into rotary motion in an internal combustion engine, it is to be understood that the apparatus 10 may equally be used in applications to convert rotary motion into linear motion. In particular, the apparatus 10 may also be used in other specific applications requiring the conversion of rotary motion into linear motion or vice versa such as, for example, nautical steering systems and/or generators.

In the case of converting linear motion into rotary motion in an internal combustion engine, the piston 30 is forced downwardly within a cylinder 32 along the rectilinear axis 26 in the direction indicated by arrow "A". As is known in internal combustion engines, the force acting on the piston 30 may be the result of combustion of a fuel (eg. such as petrol) in a combustion chamber formed above an upper surface of the piston 30, the fuel expanding as it combusts. As the connecting rod 28 and the housing 24 are formed integrally with the piston 30, the connecting rod 28 and housing 24 are also forced downwardly along the rectilinear axis 26 by the force acting on the piston 30 during the power stroke. As shown in FIG. 1, the housing 24 is constrained from movement other than along the rectilinear axis 26 by way of guide surfaces 34. As the disc 22 is constrained to remaining within the circular cavity 20, and also to rotation about the central axis 18 of the cam 16, which in turn is constrained to rotation about the fixed axis 14 of the shaft 12, the fixed axis 14 being fixed at a location on the rectilinear axis 26, the disc 22, cam 16 and shaft 12 must all move within these constraints. These constraints define the characteristics of the cycle of apparatus 10, such as the relative durations and physical length of the power and compression strokes of the piston 30.

In the case of being used in an internal combustion engine of an automobile, the shaft 12 of the apparatus 10 is operatively connected to a drive transmission which may include a gearbox, tailshaft, differential and drive shafts in order to drive wheels of the automobile.

Figure 2:
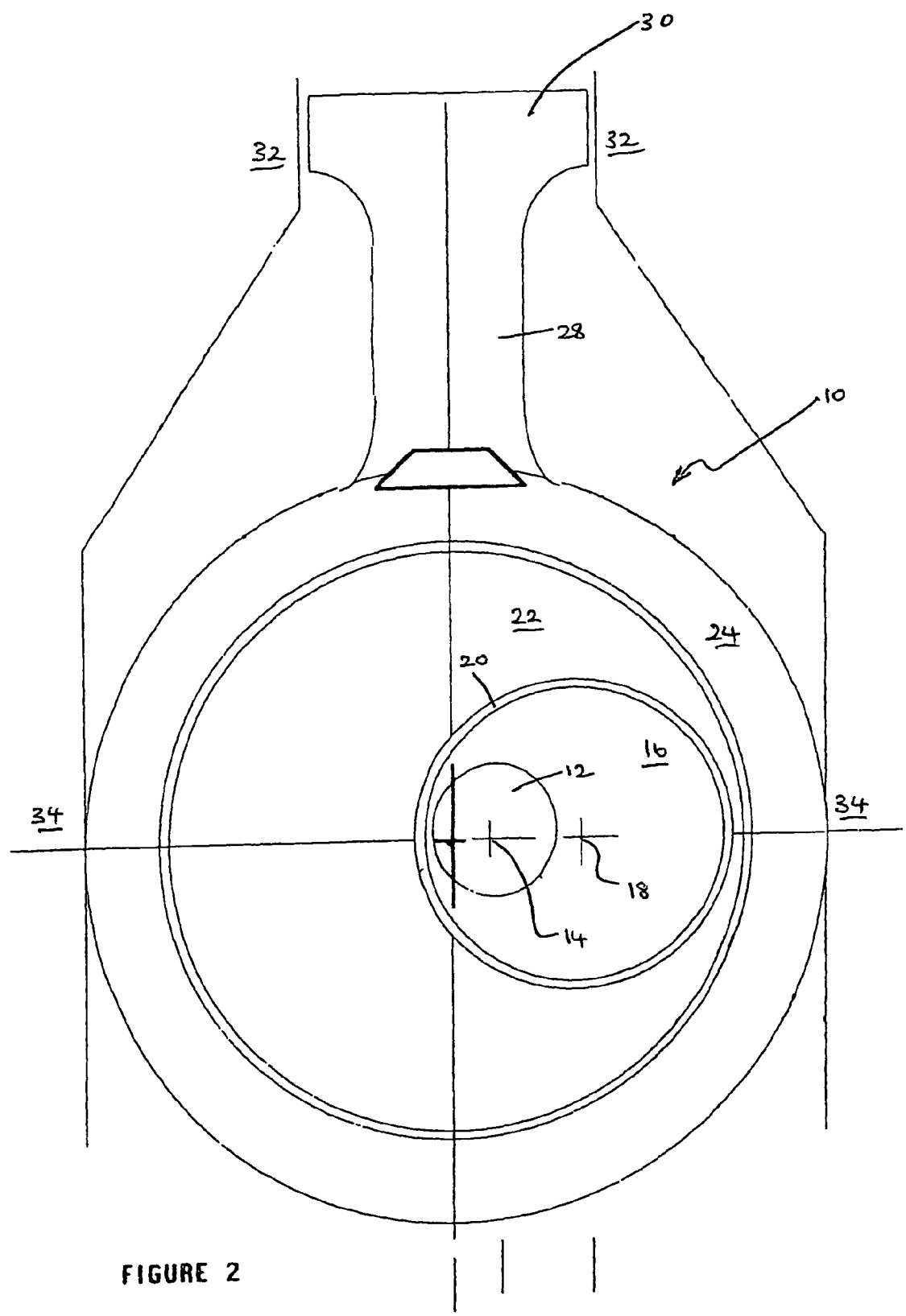
FIG. 2 is a diagrammatic front view of an alternative apparatus for converting linear motion into rotary motion or vice versa, having an asymmetric cycle.

Referring now to FIG. 2, this shows an alternative apparatus for converting linear motion into rotary motion, in which like features are represented by like reference numerals. The main difference of the apparatus shown in FIG. 2 when compared to the apparatus of FIG. 1 is due to the spacing of the fixed axis 14 of the shaft 12 from the rectilinear axis 26. By spacing the fixed axis 14 from the rectilinear axis 26 in this way, the cycle of the apparatus 10 becomes asymmetric, and this asymmetry can be designed to provide advantages in power output and/or efficiency of the internal combustion engine using the apparatus 10. In this embodiment, the diameter of the cam 16 is sufficiently large such that, when the cam 16 is at the right-most position for its cycle (as shown in FIG. 2), the left-hand side of the cam 16 extends past the rectilinear axis 26 into the left-hand half of the disc 22.

Figure 3:
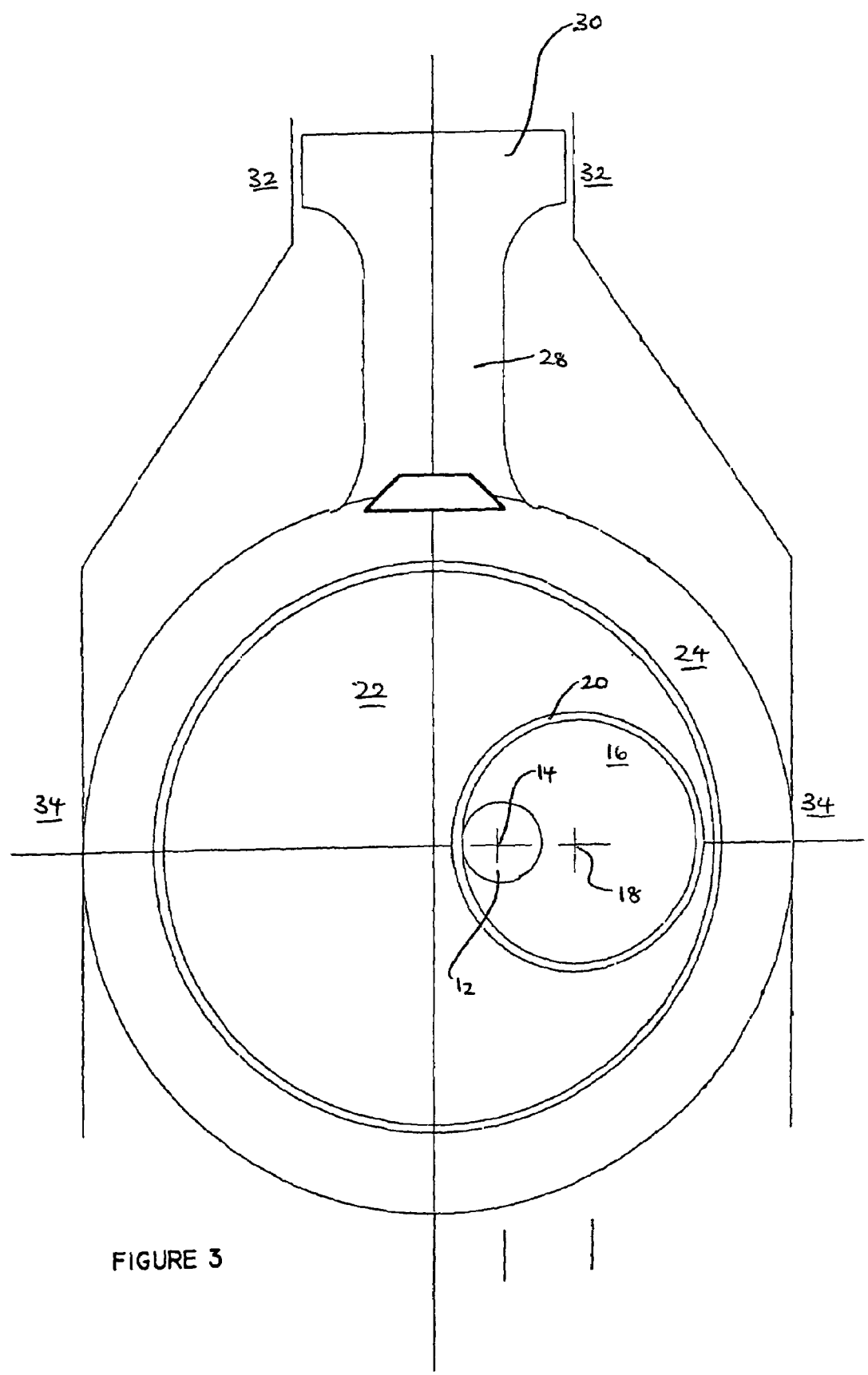
FIG. 3 is a diagrammatic front view of a further alternative apparatus for converting linear motion into rotary motion or vice versa, having an asymmetric cycle.

A further alternative apparatus 10 with an asymmetric cycle for converting linear motion into rotary motion is shown in FIG. 3, and has a relatively smaller cam 16 which fits within the right-hand half of the disc 22 when in its right-most position for its cycle, as shown. This apparatus 10 also has an asymmetric cycle by virtue of the spacing of the fixed axis 14 of the shaft 12 from the rectilinear axis 26. Accordingly, the power and compression strokes of the piston 30 of this apparatus 10 are of different relative durations owing to the asymmetry of the cycle. It should be noted however that, although both asymmetric, the specific characteristics of the cycles of the apparatuses shown in FIGS. 2 and 3 are different owing to the differences in geometry of the size and placement of the cam 16 and shaft 12, as discussed above.

Figure 4:
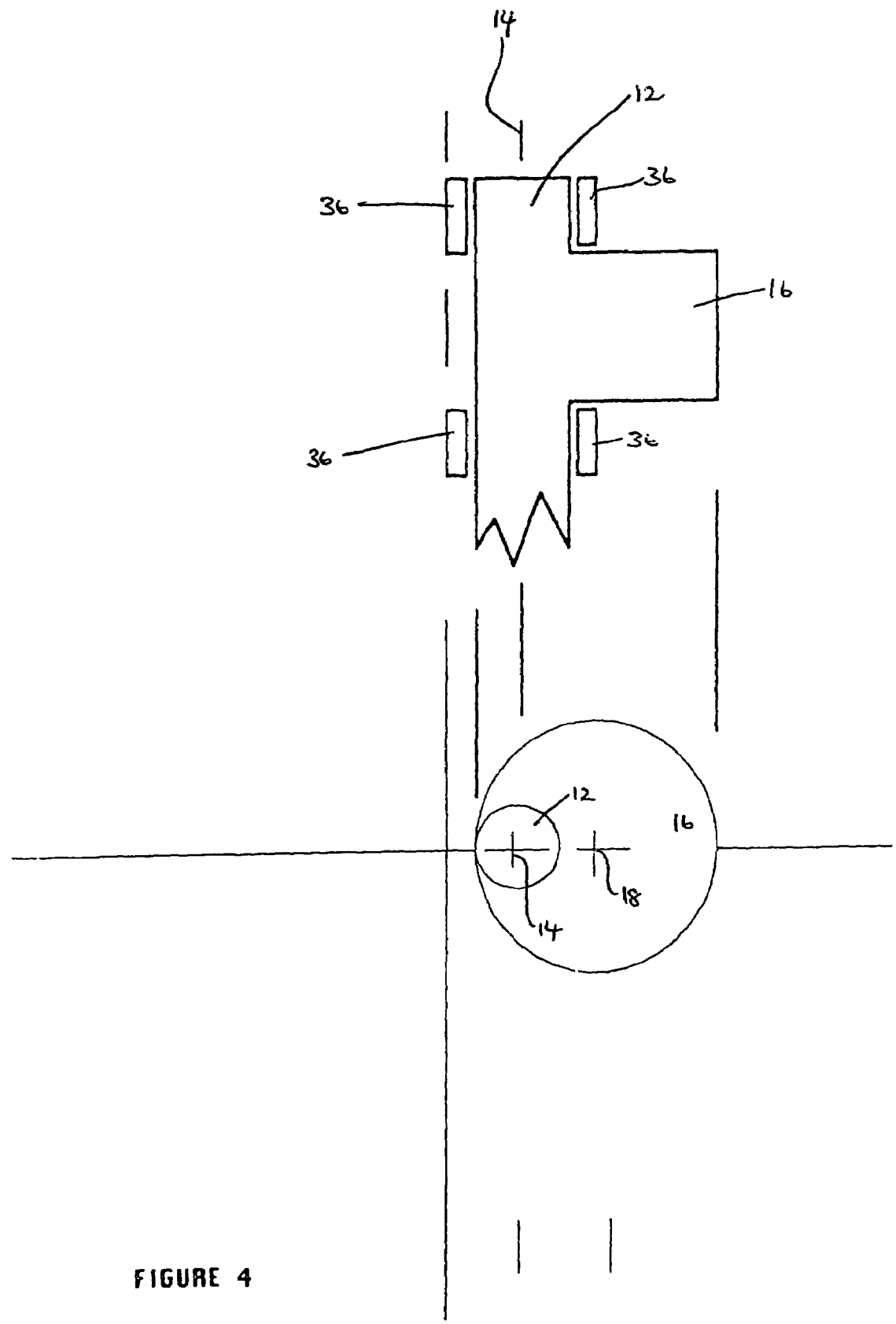
FIG. 4 is a diagrammatic sectional side view of a shaft and cam of the apparatus shown in FIG. 3.

A diagrammatic side view of the apparatus 10 of FIG. 3 is shown in FIG. 4. This view shows a portion of the shaft 12 which has the cam 16 integrally mounted to it. The diagram shows that bearings 36 are used around the shaft 12 at either side of the cam 16 to facilitate rotational movement of the shaft 12 about its axis, and to support the shaft 12 from unwanted translational movement. The side view of the portion of the shaft 12 and cam 16 is shown above a front view of the shaft 12 and cam 16 for clarity. The use of bearings for supporting rotating components is well known. Other bearings may be used to support the cam 16 and disc 22.

FIG. 5 shows a diagrammatic front view of yet another alternative apparatus 10 in which the fixed axis 14 of the shaft 12 is again spaced from the rectilinear axis 26 to provide an asymmetric cycle. FIGS. 6A to 6D illustrate configurations of the apparatus of FIG. 5 shown for successive rotational positions of the shaft 14, at clockwise intervals of 90° (or π/2 radians). More particularly, FIG. 6A shows the configuration of the apparatus 10 with the central axis 18 of the cam 16 to the right-hand side of the fixed axis 14 of the shaft 12; FIG. 6B shows the configuration of the apparatus 10 with the central axis 18 of the cam 16 directly below the fixed axis 14 of the shaft 12; FIG. 6C shows the configuration of the apparatus 10 with the central axis 18 of the cam 16 to the left-hand side of the fixed axis 14 of the shaft 12; and FIG. 6D shows the configuration of the apparatus 10 with the central axis 18 of the cam 16 directly above the fixed axis 14 of the shaft 12. Further clockwise rotation of the shaft 12 by a further interval of 90° (or π/2 radians) from the configuration shown in FIG. 6D results in the apparatus 10 returning to the configuration shown in FIG. 6A. By virtue of the common reference line 38 which is perpendicular to the rectilinear axis 26, the relative linear movement of the disc 22 along the rectilinear axis 26 can be clearly seen.

Figure 7:
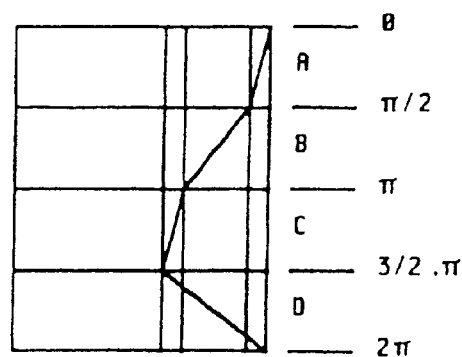
FIG. 7 is a graph showing the relative movement of the journal of the apparatus of FIGS. 5 to 6D along a rectilinear axis for each of the four discreet configurations shown in FIGS. 6A to 6D.

The relative movement of the disc 22 along the rectilinear axis 26 for each of the four discreet configurations shown in FIGS. 6A to 6D is shown diagrammatically in FIG. 7. FIG. 7 shows that the compression stroke of the asymmetric cycle of the apparatus 10 depicted in FIGS. 5 to 6d occurs across ¾ of the duration of the cycle (assuming the shaft 12 rotates with constant angular velocity—a reasonable assumption if a flywheel is coupled to the shaft 12), from the 0 radian position of the shaft 12 (relative to the rotation of the shaft 12 in the configuration shown in FIG. 6A) to the 3π/2 radian position of the shaft 12 shown in FIG. 6D. Conversely, the power (expansion) stroke of the asymmetric cycle of the apparatus 10 occurs across a relative short period—just ¼ of the duration of the cycle—between the configuration shown in FIG. 6D and the configuration shown in FIG. 6A. Accordingly, the mean velocity of the piston 30 during the expansion stroke is increased owing to the asymmetry of the present apparatus 10. As the expansion stroke corresponds with the power stroke in an internal combustion engine (in a 2-stroke cycle every expansion stroke is a power stroke whereas in a 4-stroke cycle every second expansion stroke is a power stroke), the mean velocity of the piston 30 during the power stroke is thus increased by virtue of the asymmetry of the apparatus 10. Consequently, as power output of an internal combustion engine is proportional to the velocity of the piston during the power stroke, the power output of an internal combustion engine using the present apparatus 10 is also increased. The specific geometry of the spacing, sizing and relative location of the shaft 12, cam 16 and disc 22 may of course be adjusted according to the desired characteristics of the cycle, and in particular to how radical is the desired increase in velocity of the piston 30 during the power stroke.

Figure 8A:
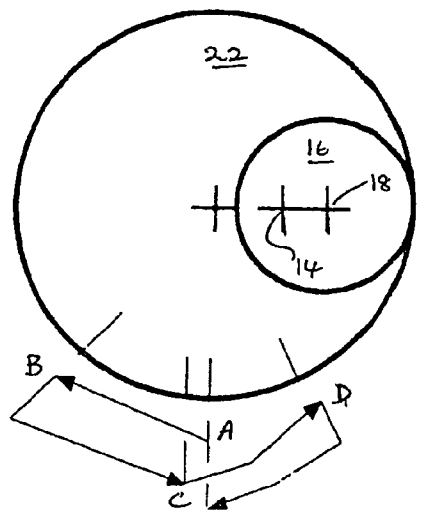
FIG. 8A is a diagrammatic front view showing the relative positioning of central axes of a shaft, cam and journal and indicates the oscillating rotation of the journal of an apparatus having a symmetric cycle.
Figure 8B:
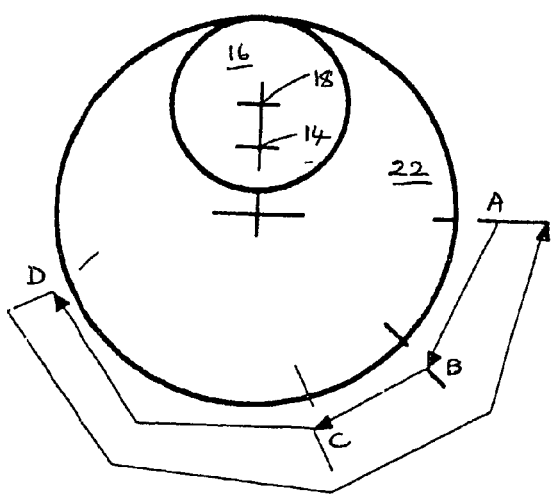
FIG. 8B is a diagrammatic front view showing the relative positioning of central axes of a shaft, cam and journal and indicates the oscillating rotation of the journal of an apparatus having an asymmetric cycle.

Now referring to FIGS. 8A and 8B, these diagrams show relative rotation of the disc 22 through the four quadrants of rotation of the shaft 12 about the fixed axis 14 for both an apparatus having a symmetric cycle (FIG. 8A) and for an apparatus having an asymmetric cycle (FIG. 8B). Rotation of the disc 22 in each case is oscillatory in that the disc does not rotate through a complete rotation. Rather, as can be seen in FIG. 8A the disc travels through a maximum arc of approximately 90° for the symmetric apparatus, and a maximum arc of approximately 170° for the asymmetric apparatus. More particularly, the reference letters A, B, C and D show relative rotation of the disc 22 corresponding to the four quadrants of rotation of the shaft 12 about the fixed axis 14 in order, cycling through A, B, C, D, A, B, C, D, A, B, etc. . . . As can be seen from the asymmetric case of FIG. 8B, the disc 22 rotates clockwise for the first three quadrants of clockwise rotation of the shaft 12, then through one large anticlockwise rotation for the final quadrant. In contrast, in the case of the symmetric case, FIG. 8A shows that the disc 22 rotates clockwise for the first quadrant of clockwise rotation of the shaft 12, anticlockwise for the second quadrant, anticlockwise for the third quadrant, and clockwise for the fourth quadrant.

Although the invention has been described with specific reference to an apparatus for converting linear motion into rotary motion, it should be appreciated that the apparatus also has application to converting rotary motion into linear motion.

The invention has been described by way of non-limiting example only, and many modifications and variations may be made thereto without departing from the spirit and scope of the invention as hereinbefore described. In particular, the applicant has foreseen that in alternative apparatus the disc and surrounding housing may perform reciprocating motion along a curved path rather than along a straight rectilinear axis.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. An apparatus for converting linear motion into rotary motion or vice versa comprising a shaft which is rotatable about a fixed axis and carrying a circular cam mounted eccentrically relative to that axis, the cam being rotatably mounted within a circular journal, an axis of rotation of the cam relative to the journal being spaced from a center of the journal, the journal being in turn rotatably mounted within a housing mounted for reciprocating motion along a second axis in a direction transverse to the axis of the shaft whereby reciprocating motion of the housing along the second axis is converted into rotation of the shaft, or rotation of the shaft is converted into reciprocating motion of the housing along the second axis, wherein the second axis intersects the center of the journal, and the fixed axis of the shaft is spaced from the second axis.

2. An apparatus as claimed in claim 1, wherein the journal is arranged so that rotation of the journal relative to its center oscillates between clockwise and counter-clockwise rotation, in response to unidirectional rotation of the shaft relative to the axis of the shaft.

3. An apparatus as claimed in claim 1 wherein the journal is in the form of a disc.

4. An apparatus as claimed in claim 1 wherein in rotation of the shaft there exists a configuration in which the fixed axis, the axis of rotation of the cam relative to the journal, and the center of the journal are aligned in a line perpendicular to the second axis.

5. An apparatus as claimed in claim 1, wherein the spacing of the fixed axis of the shaft from the second axis is such that the duration of a power stroke of the piston is shortened relative to a compression stroke of the piston.

6. An apparatus as claimed in claim 5, wherein the shortening of the duration of the power stroke results in an increase in the mean velocity of the piston over the power stroke.

7. A nautical steering system including an apparatus for converting linear motion into rotary motion or vice versa, the apparatus comprising a shaft which is rotatable about a fixed axis and carrying a circular cam mounted eccentrically relative to that axis, the cam being rotatably mounted within a circular journal, an axis of rotation of the cam relative to the journal being spaced from a center of the journal, the journal being, in turn, rotatably mounted within a housing mounted for reciprocating motion along a second axis in a direction transverse to the axis of the shaft whereby reciprocating motion of the housing along the second axis is converted into rotation of the shaft, or rotation of the shaft is converted into reciprocating motion of the housing along the second axis, wherein the second axis intersects the center of the journal, and the fixed axis of the shaft is spaced from the second axis.

* * * * *